United States Patent [19]
Sano et al.

[11] Patent Number: 5,326,811
[45] Date of Patent: Jul. 5, 1994

[54] PLATED POLYAMIDE RESIN ARTICLES

[75] Inventors: Hironari Sano; Koji Nishida, both of Mie, Japan

[73] Assignee: Mitsubishi Petrochemical Co., Ltd., Tokyo, Japan

[21] Appl. No.: 899,907

[22] Filed: Jun. 17, 1992

[30] Foreign Application Priority Data

Jun. 17, 1991 [JP] Japan .................................. 3-144912

[51] Int. Cl.$^5$ .............................................. C08L 77/00
[52] U.S. Cl. ...................................... 524/505; 525/92
[58] Field of Search .......................... 524/505; 525/92

[56] References Cited

U.S. PATENT DOCUMENTS

| | | | |
|---|---|---|---|
| 3,617,320 | 11/1971 | Lee | 524/414 |
| 4,452,858 | 6/1984 | Take et al. | 428/331 |
| 4,859,739 | 8/1989 | Yates, III et al. | 525/92 |
| 4,874,810 | 10/1989 | Lee, Jr. et al. | 525/92 |
| 4,960,825 | 10/1990 | van der Meer | 524/505 |
| 5,091,473 | 2/1992 | Arashiro et al. | 525/92 |

FOREIGN PATENT DOCUMENTS

| | | |
|---|---|---|
| 57-123231 | 7/1982 | Japan . |
| 60-96648 | 5/1985 | Japan . |
| 61-281149 | 12/1986 | Japan . |
| 63-150348 | 6/1988 | Japan . |

*Primary Examiner*—Paul R. Michl
*Assistant Examiner*—Edward Cain
*Attorney, Agent, or Firm*—Oblon, Spivak, McClelland, Maier & Neustadt

[57] ABSTRACT

A plated polyamide resin article obtained by plating, with a suitable plating substance, a molded article of a polyamide resin composition is disclosed, the polyamide resin composition comprising (A) from 30 to 80% by weight of a polyamide resin, (B) from 20 to 70% by weight of a polyphenylene ether resin, (C) from 1 to 50 parts by weight, per 100 parts by weight of the sum of (A) and (B), of an impact modifier, and (D) from 0.01 to 30 parts by weight, per 100 parts by weight of the sum of (A) and (B), of a compatibilizer, in which the polyamide resin forms a continuous phase, and the polyphenylene ether resin forms a dispersed phase, with the polyamide resin having a crystallinity of from 20 to 55% with the crystalline region thereof being not less than 72% in the $\gamma$ crystal form. The plated article is excellent in heat resistance, impact resistance, and appearance.

22 Claims, No Drawings

PLATED POLYAMIDE RESIN ARTICLES

FIELD OF THE INVENTION

The present invention relates to a plated polyamide resin article which is excellent in heat resistance, mechanical strength, and dimensional stability and is useful in a variety of products, such as hubcaps, rear deck side panels of trucks, and electrical parts.

BACKGROUND OF THE INVENTION

Plated plastic articles, made of plated ABS resin (acrylonitrile-butadiene-styrene copolymer), enjoy wide spread use as hubcaps of automobiles, buttons, TV knobs, electromagnetic shielding printer housings and other diverse end products.

While plated ABS resin articles are excellent in gloss, they are insufficient in heat resistance and impact resistance. Heat-resistant polypropylene plated articles are used for hubcaps of automobiles, but they are even worse than plated ABS resin articles in impact resistance.

Stainless steel plates have been used as the rear deck side panels of trucks. Since the material for this use is required to have high heat resistance, high impact resistance, and high flexural strength, plated articles of polyamide resins which are excellent in heat resistance and impact resistance are expected to be useful to replace the steel plates.

Plated glass fiber-reinforced nylon articles are known, but they have poor surface gloss. It has been proposed to etch the surface of polyamide resin molded articles containing an inorganic filler prior to plating as disclosed in JP-A-57-123231, JP-A-63-150348, JP-A-60-96648, and JP-A-61-281149 (the term "JP-A" as used herein means an "unexamined published Japanese patent application"). However, the resulting plated articles have low plate adhesion. Additionally the plating bath becomes contaminated by extraction of the inorganic filler by the etching solution.

SUMMARY OF THE INVENTION

Accordingly, an object of the present invention is to provide a plated polyamide resin article excellent in heat resistance, impact resistance, flexural strength, and plate adhesion.

A further object of the present invention is to provide a process for preparing a plated polyamide resin article having the above advantages.

The above objects of this invention have been accomplished by a plated polyamide resin article obtained by plating, with a suitable plating substance, a molded article of a polyamide resin composition comprising (A) from 30 to 80% by weight of a polyamide resin (hereinafter abbreviated as PA) having a relative viscosity of not less than 2.0 in 98% concentrated sulfuric acid at 25° C., (B) from 20 to 70% by weight of a polyphenylene ether resin (hereinafter abbreviated to as PPE) having an intrinsic viscosity of not less than 0.15 dl/g in chloroform 30° C., (C) from 1 to 50 parts by weight, per 100 parts by weight of the sum of (A) and (B), of an impact modifier, and (D) from 0.01 to 30 parts by weight, per 100 parts by weight of the sum of (A) and (B), of a compatibilizer, in which the PA forms a continuous phase, and the PPE forms a dispersed phase, with the PA having a crystallinity of from 20 to 55% with the crystalline region having not less than 72% of a γ crystal fraction.

DETAILED DESCRIPTION OF THE PREFERRED EMBODIMENTS

When the PA molded article obtained from the resin composition of the present invention is subjected to acid etching, the acid of the etching solution first dissolves the amorphous region of the PA continuous phase. This forms fine voids into which the plating layer is anchored to provide improved adhesion of the plating layer to the PA molded article. This is also known as an anchoring effect.

The PA resin of the present invention contains a γ crystal form only or both α and γ crystal forms. Each of the α and γ crystal forms contain crystalline regions and amorphous regions. The γ crystal form is more susceptible to etching than the α crystal form. Since this greater susceptibility to etching provides a greater contribution to the anchoring effect, it is necessary that the γ crystal fraction in the PA continuous phase should be at least 72%.

The PPE phase, which forms islands in the PA continuous phase, is not dissolved by the etching acid and remains in the PA continuous phase as fine particles to prevent reduction of the hygroscopic properties of the PA.

The impact modifier (component (C)) functions to increase the impact strength of the plated article. The compatibilizer (component (D)) facilitates fine dispersion of the PPE particles and also contributes to improvements in impact resistance and flexural strength of the plated articles.

The PA molded article to be plated is obtained from a polyamide resin composition comprising (A) from 30 to 80% by weight of PA having a relative viscosity of not less than 2.0 in 98% concentrated sulfuric acid at 25° C., (B) from 20 to 70% by weight of PPE having an intrinsic viscosity of not less than 0.15 dl/g in chloroform at 30° C., (C) from 1 to 50 parts by weight, per 100 parts by weight of the sum of (A) and (B), of an impact modifier, and (D) from 0.01 to 30 parts by weight, per 100 parts by weight of the sum of (A) and (B), of a compatibilizer, in which the PPE is dispersed to a number average particle size of not more than 1 μm, with the PA forming a continuous phase having a crystallinity of from 20 to 55%, with the crystalline region thereof having not less than 72% of a γ crystal fraction.

Polyamides (PA) which can be used in the present invention typically include nylon 4, nylon 6, nylon 66, nylon 610, nylon 8, nylon 10, nylon 11, nylon 12, and nylon 46, with nylon 6, nylon 66, and nylon 8 being preferred. These polyamide resins may be used either individually or in combinations of two or more. Further, the above-described linear polyamide resins may be used as a blend with known aromatic polyamide resins as long as a crystallinity of 20% or higher is maintained. These resins are commercially available.

The PA to be used in the present invention has a relative viscosity of not less than 2.0, preferably from 2.0 to 8.0, and more preferably from 2.5 to 7.0, as measured according to JIS K6810 (in 98% sulfuric acid at 25° C.). If the relative viscosity is less than 2.0, the molded article undergoes over-etching with an acid to have reduced plate adhesion, causing plate-resin separation or "blister" to occur in extreme cases. If it exceeds 8.0, the moldability of the resin composition is reduced.

A PPE which can be used in the present invention is a polymer comprising a repeating unit represented by formula (I):

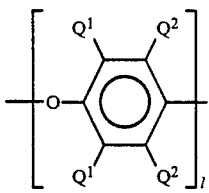

wherein $Q^1$ and $Q^2$ each represents a hydrogen atom, a halogen atom, a $C_1$-$C_{20}$-hydrocarbon group containing no tertiary α-carbon atom, a halogenated $C_1$-$C_{20}$-hydrocarbon group having at least two carbon atoms between a halogen atom and a phenyl nucleus, a $C_1$-$C_{20}$-hydrocarbon oxy group, or a halogenated $C_1$-$C_{20}$-hydrocarbon oxy group having at least two carbon atoms between a halogen atom and a phenyl nucleus; and l represents an integer of at least 50, the ether oxygen atom per unit being bonded to the benzene nucleus of the adjacent unit.

Typical examples of PPE are poly(2,6-dimethyl-1,4-phenylene)ether, poly(2,6-diethyl-1,4-phenylene)ether, poly(2-methyl-6-ethyl-1,4-phenylene)ether, poly(2-methyl-6-propyl-1,4-phenylene)ether, poly(2,6-dipropyl-1,4-phenylene)ether, poly(2-ethyl-6-propyl-1,4-phenylene)-ether, poly(2,6-dibutyl-1,4-phenylene)ether, poly(2,6-dipropenyl-1,4-phenylene)ether, poly(2,6-dilauryl-1,4-phenylene)ether, poly(2,6-diphenyl-1,4-phenylene)ether, poly(2,6-dimethoxy-1,4-phenylene)ether, poly(2,6-diethoxy-1,4-phenylene)ether, poly(2-methoxy-6-ethoxy-1,4-phenylene)ether, poly(2-ethyl-6-stearyloxy-1,4-phenylene)-ether, poly(2,6-dichloro-1,4-phenylene)ether, poly(2-methyl-6-phenyl-1,4-phenylene)ether, poly(2,6-dibenzyl-1,4-phenylene)ether, poly(2-ethoxy-1,4-phenylene)ether, poly(2-chloro-1,4-phenylene)ether, poly (2,5 -dibromo- 1,4 -phenylene)ether, and analogues thereof. Copolymers, such as a 2,6-dimethylphenol/2,3,6-trimethylphenol copolymer, a 2,6-dimethylphenol/2,3,5,6-tetramethylphenol copolymer, and a 2,6-diethylphenol/2,3,6-trimethylphenol copolymer, may also be used. In addition, modified PPE, such as PPE comprising the repeating unit (I) to which a styrene monomer (e.g., styrene, p-methylstyrene, and α-methylstyrene) is grafted, may also be used as the PPE component. Processes for preparing the above-mentioned PPE are described, e.g., in U.S. Pat. Nos. 3,306,874, 3,306,875, 3,257,357, and 3,257,358, JP-B-52-17880 (the term "JP-B" as used herein means an "examined published Japanese patent application"), and JP-A-50-51197.

The PPE to be used has an intrinsic viscosity of from 0.15 to 0.90 dl/g, preferably from 0.3 to 0.7 dl/g, and more preferably from 0.35 to 0.6 dl/g (in chloroform at 30° C.). If the intrinsic viscosity is less than 0.15 dl/g, the resulting molded article has reduced mechanical properties. If it exceeds 0.90 dl/g, the resin composition has poor moldability.

If desired, the PPE component may contain up to 50% by weight of polystyrene resins, such as polystyrene, high-impact polystyrene, an acrylonitrile-styrene copolymer, an acrylate-styrene copolymer, an acrylonitrile-styrene-butadiene copolymer, or a styrene-maleic anhydride copolymer.

The impact modifier which can be used in the present invention includes elastomers, such as aromatic alkenyl compound-conjugated diene block copolymers, ethylene-α-olefin copolymer elastomers, ethylene-α-olefin terpolymers, styrene-grafted ethylene-α-olefin elastomers, and core/shell elastomers comprising crosslinked polybutadiene or crosslinked polybutyryl acrylate as a core and polyacrylate or polystyrene as an outer shell.

The aromatic alkenyl compound-conjugated diene block copolymer is represented by formula (II):

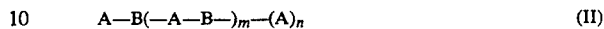

wherein A is a polymer block derived from an aromatic alkenyl compound; B is an elastomeric block copolymer of a conjugated diene; m is 0 or a positive integer of 1, 2 or 3; and n is 0 or 1.

The aromatic alkenyl compound constituting polymer block A may include styrene, α-methylstyrene, vinyltoluene, other lower alkyl-substituted styrene monomers, or vinylnaphthalene, with styrene being preferred. The conjugated diene in polymer block B may include butadiene, isoprene, or a mixture of butadiene and isoprene, with butadiene being preferred. The conjugated diene component may contain cyclopentadiene or a derivative thereof or a lower alkyl-substituted butadiene, e.g., 2,3-dimethylbutadiene. The diene component may further contain an olefinic hydrocarbon, such as ethylene, propylene, and 1-butene, or a non-conjugated diene as long as the elastomeric properties of polymer block A are not considerably impaired.

Polymer block A may have a weight average molecular weight of from 500 to 125000, preferably from 5000 to 110000, and polymer block B may have a weight average molecular weight of from 15000 to 250000, preferably from 15000 to 220000. The block copolymer may contain, in part, a polymer block A or B of lower molecular weight. The component derived from the aromatic alkenyl compound is preferably present in the block copolymer in an amount of from 15 to 50% by weight. If the amount is not within this range, the resulting molded article tends to have insufficient impact strength. A part of the double bonds derived from the conjugated diene may be hydrogenated to a degree of not more than 90%. Additionally, the block copolymer may be a mixture of two or more different species.

Particularly preferred impact modifiers are the above-mentioned aromatic alkenyl compound-conjugated diene block copolymer or a partial hydrogenation product thereof, an α,β-unsaturated carboxylic acid (or anhydride)-modified ethylene-α-olefin copolymer elastomer, and an α,β-unsaturated carboxylic acid (or anhydride)-modified ethylene-α-olefin terpolymer. In particular, a mixture of the aromatic alkenyl compound-conjugated diene block copolymer or a hydrogenation product thereof and the modified ethylene-α-olefin copolymer elastomer or ethylene-α-olefin terpolymer at a weight mixing ratio of from 20/80 to 80/20 brings about satisfactory impact strength and moisture resistance.

The compatibilizer which can be used in the present invention may include any compound capable of compatibilization between PA and PPE. Among them, those having (a) an unsaturated group and (b) an amidophilic group per molecule are preferred.

The unsaturated group (a) of the compatibilizer includes a carbon-to-carbon double bond and a carbon-to-carbon triple bond. The terminology "amidophilic group" as used herein means a functional group showing affinity or chemical reactivity to the amido linkage contained in PA or a carboxyl group or an amino group present at the chain terminals of PA. Examples of such amidophilic groups are a carboxyl group, groups derived from a carboxyl group (e.g., salts, esters, acid amides, acid anhydrides, acid imides, acid azides, and acid halides), an oxazoline residue, a nitrile group, an epoxy group, an amino group, a hydroxyl group, and an isocyanic acid ester group. The compounds having functional groups (a) and (b) in the molecule thereof may include unsaturated carboxylic acids, unsaturated carboxylic acid derivatives, unsaturated epoxy compounds, unsaturated alcohols, unsaturated amine compounds, and unsaturated isocyanic esters.

Specific examples of these compounds include maleic anhydride, maleic acid, fumaric acid, maleimide, maleic hydrazide, a reaction product of maleic anhydride and an aliphatic or aromatic diamine, methylnudic anhydride, dichloromaleic anhydride, maleinamide, itaconic acid, itaconic anhydride, natural fats and oils (e.g., soybean oil, tung oil, castor oil, linseed oil, hemp-seed oil, cotton seed oil, sesame oil, rape oil, peanut oil, camellia oil, olive oil, coconut oil, and sardine oil), epoxidized natural fats and oils (e.g., epoxidized soybean oil), unsaturated carboxylic acids (e.g., acrylic acid, butenoic acid, crotonic acid, vinylacetic acid, methacrylic acid, pentenoic acid, angelic acid, tiglic acid, 2-pentenoic acid, 3-pentenoic acid, α-ethylacrylic acid, β-methylcrotonic acid, 4-pentenoic acid, 2-hexenoic acid, 2-methyl-2-pentenoic acid, 3-methyl-2-pentenoic acid, α-ethylcrotonic acid, 2,2-dimethyl-3-butenoic acid, 2-heptenoic acid, 2-octenoic acid, 4-decenoic acid, 9-undecenoic acid, 10-undecenoic acid, 4-dodecenoic acid, 9-tetradecenoic acid, 9-hexadecenoic acid, 2-octadecenoic acid, 9-octadecenoic acid, eicosenoic acid, docosenoic acid, erucic acid, tetracosenoic acid, mycolipenic acid, 2,4-pentadienoic acid, 2,4-hexadienoic acid, diallylacetic acid, geranic acid, 2,4-decadienoic acid, 2,4-dodecadienoic acid, 9,12-hexadecadienoic acid, 9,12-octadecadienoic acid, hexadecatrienoic acid, linoleic acid, linolenic acid, octadecatrienoic acid, eicosadienoic acid, eicosatrienoic acid, eicosatetraenoic acid, ricinoleic acid, eleostearic acid, oleic acid, eicosapentaenoic acid, escin acid, docosadienoic acid, docosatrienoic acid, docosatetraenoic acid, docosapentaenoic acid, tetracosenoic acid, hexacosenoic acid, hexacodienoic acid, octacosenoic acid, and triacontenoic acid) and esters, acid amides or anhydrides of these unsaturated carboxylic acids, unsaturated amines derived by substituting a hydroxyl group of unsaturated alcohols (e.g., allyl alcohol, crotyl alcohol, methylvinylcarbinol, allylcarbinol, methylpropenylcarbinol, 4-penten-1-ol, 10-undecen-1-ol, propargyl alcohol, 1,4-pentadien-3-ol, 1,4-hexadien-3-ol, 3,5-hexadien-2-ol, 2,4-hexadien-1-ol, unsaturated aliphatic alcohols, 3-butene-1,2-diol, 2,5-dimethyl-3-hexene-2,5-diol, 1,5-hexadiene-3,4-diol, 2,6-octadiene-4,5-diol) with —NH$_2$, and low polymers (e.g., having an average molecular weight of from 500 to 10000) or high polymers (e.g., having an average molecular weight of 10000 or more) of a conjugated diene, such as butadiene, or isoprene, to which maleic anhydride or a phenolic compound is added or into which a functional group, such as an amino group, a carboxylic group, a hydroxyl group, or an epoxy group, is introduced.

The compatibilizers may contain two or more of the groups (a), which may be the same or different, and two or more of the groups (b), which may be the same or different, per molecule.

The molded article which can be used in the present invention is obtained by extrusion or injection molding of a resin composition comprising the above-described components (A) to (D). In the molded article, the dispersed PPE phase has an average longest axis length of from 0.01 to 15 μm and an average shortest axis length of 0.01 to 8 μm, and a number average particle size of not more than 1 μm, and the continuous PA phase has a crystallinity of from 20 to 55%, with the crystalline region thereof being 72% or more in the γ crystal form.

The PA content in the total thermoplastic resins (PA+PPE) ranges from 30 to 80% by weight, preferably from 35 to 70% by weight, and more preferably from 40 to 65% by weight. If the PA content is less than 30%, the resin composition has poor moldability and, when injection molded, develops, at the gate, a surface defect called silver stream. As a result, the plated article has poor appearance and reduced plate adhesion. A PA content exceeding 80% also results in insufficient plate adhesion.

The PPE content in the total thermoplastic resins (PA+PPE) ranges from 20 to 70% by weight, preferably from 25 to 70% by weight, more preferably from 25 to 60% by weight, and most preferably from 30 to 55% by weight. If the PPE content is less than 20%, the resulting molded article has poorer thermal rigidity. If it exceeds 70%, the composition has insufficient plate adhesion due to a decrease in moldability.

The impact modifier is added in an amount of from 1 to 50 parts by weight per 100 parts by weight of the total thermoplastic resins (PA+PPE). The impact modifier is preferably added in an amount of from 3 to 50 parts by weight, and particularly from 5 to 35 parts by weight in order to provide a plated article which shows ductile fracture in a drop-weight test. While the addition of levels of an impact modifier higher than 50 parts by weight will provide further improved impact strength, the plating layer of those articles, especially those with sharp edges, suffers from reduced plate adhesion and develops blister on exposure to thermal cycles.

The compatibilizer is added in an amount of from 0.01 to 30 parts by weight, preferably from 0.05 to 30 parts by weight, more preferably from 0.1 to 15 parts by weight, and most preferably from 0.2 to 5 parts by weight, per 100 parts by weight of the total thermoplastic resins (PA+PPE). For decorative applications, which require only low impact strength, addition of a compatibilizer is not particularly needed. Even in such cases, it is recommended to add at least 0.01 part of a compatibilizer for manifestation of the effects of the above-described impact modifier. If the amount of the compatibilizer exceeds 30 parts, reduced plate adhesion results.

If desired, the resin composition may contain, in addition to components (A) to (D), other thermoplastic or thermosetting resins. Further, the resin composition may contain compounding additives, such as antioxidants, flame retardants, pigments, dyes, weathering agents, antistatic agents, glass fiber, glass beads, and other inorganic fillers.

The PA resin molded article to be plated should have a specific microstructure in terms of crystal form and crystallinity of the surface PA phase. That is, the PA continuous phase on the surface of the molded article should have crystal forms having a γ crystal fraction of at least 72%, preferably 75% or more, and more preferably 80% or more. With the γ crystal form of PA falling within this range, plated articles can be obtained which have high plate adhesion with little scatter. If the proportion of the γ crystal form is less than 72%, the etching of the PA prior to plating is insufficient for obtaining a satisfactory anchoring effect. This results in poor plate appearance and reduced plate adhesion.

Further, the PA component should have a crystallinity of from 20 to 55%, preferably from 25 to 50%, and more preferably from 30 to 50%. If the PA crystallinity exceeds 55%, a reduction in plate adhesion is observed, due to insufficient etching. This insufficient etching is a result of the overly dense crystal structure. If the PA crystallinity is less than 20%, the surface PA undergoes over-etching, also resulting in a reduction in plate adhesion.

The crystal form and crystallinity of PA on the surface of a resin molded article can be determined by analysis of an X-ray diffraction pattern ($2\theta = 5°$ to $35°$) of a cut area of the article obtained by use of an X-ray generating apparatus "RU-200" and an X-ray diffractometer "RMG-A2" both manufactured by Rigaku Denki K.K. Specifically, the background and amorphous halo of PPE are first subtracted from the peak intensity. Then the intensity (A) corresponding to the diffraction assigned to the amorphous region of PA, having a peak at $2\theta = 20°$, is further subtracted to obtain a diffraction intensity corresponding only to the crystalline region. Then, the diffraction intensities corresponding to the α crystal form of PA having peaks at $2\theta = 20°$ (B) and $2\theta = 24°$ (C) and the diffraction intensity corresponding to the γ crystal form of PA having a peak at $2\theta = 21°$ (D) were separated by Gaussian peak separation to obtain the respective peak area. Crystallinity (%) and γ crystal fraction (%) can be calculated from the resulting peak areas according to equations (i) and (ii):

$$\text{Crystallinity} = \frac{\{(B) + (C) + (D)\} \times 100}{(A) + (B) + (C) + (D)} \quad (i)$$

$$\gamma \text{ Crystal Fraction} = \frac{(D) \times 100}{\{(B) + (C)\} \times 0.5 + (D)} \quad (ii)$$

The platability and dynamic strength of the molded article can be improved by appropriately controlling the form of the dispersed PPE in the PA phase and the form of the impact modifier in the PPE phase.

The PPE dispersed phase may have various forms, such as a spherical form, an ellipsoid form (resulting from rotational uniaxial stretching of a sphere), and a disc form (resulting from rotational biaxial stretching of a sphere). These various forms are the result of shear forces imposed during the molding or forming process. The molding of forming process may include injection molding, extrusion, blow molding, vacuum forming, pressure forming, rotoforming, or stretching. The dispersed PPE particles preferably have an average longest axis length of from 0.01 to 15 μm, more preferably from 0.05 to 10 μm, and most preferably from 0.1 to 7 μm, and an average shortest axis length of from 0.01 to 8 μm, more preferably from 0.05 to 4 μm, and most preferably from 0.05 to 2.5 μm. The number average particle size of these PPE particles is not more than 1 μm. Particles of larger size tend to deteriorate the plate appearance by making the molded article surface noticeably uneven. Particles of smaller size tend to reduce plate adhesion. The microstructure of the PPE dispersed phase in the resin molded article can be determined by observing a sliced sample stained with a transition metal oxide, such as osmium tetroxide, or ruthenium tetroxide, under a transmission electron microscope (e.g., "JEM-100CX" manufactured by Japan Electron Optics Laboratory Co., Ltd.). Each selectively stained polymer component in the resin molded article can be photographically discriminated. The micrograph of the slice is analyzed by an image analyzer (e.g., "SPICA II" manufactured by Nippon Avionics K.K.), to determine the size of the dispersed particles.

The desired microstructure of the resin molded article can be achieved by the appropriate selection of a combination of various factors, such as the chemical structure and molecular weight of each component, the method and conditions of blending, the method and conditions of molding, and the types and amounts of various additives. These means are only illustrative examples and are not to be construed as limiting the present invention.

The resin composition may be prepared by various blending methods, for example, blending all the resin components, blending a resin component with a stabilizer and a colorant, or blending a resin component with a filler. For example, powdered or granulated components are uniformly mixed in a mechanical mixing apparatus, such as a Henschel mixer, a ribbon blender, a twin-cylinder mixer, or a Naughter mixer, and the resulting dry blend is melt-kneaded at a temperature of from 180° to 370° C. in a general kneading machine, such as a single-screw extruder, a twin-screw extruder, a Banbury mixer, a roll, or a kneader. The resultant molten resin mixture may be pelletized. The melt-kneading step may be carried out on all components simultaneously or in two or more stages. For example, PPE may first be melt-kneaded with a compatibilizer, and PA then added thereto followed by further kneading, or PPE, a compatibilizer, and part of PA may be melt-kneaded to synthesize a PPE-PA block copolymer in a molten state, and the rest of PA and the other desired components added thereto followed by further kneading.

The resin composition thus prepared is molded by molding methods generally adopted for thermoplastic resins, such as injection molding, extrusion, press molding, blow molding, or rotational molding. These methods may be used singly or in combination. For example, a resin layer may be formed on an extruded article by injection molding.

Suitable molding conditions, for maintaining the above-described specific microstructure in the PA continuous phase, are 200° to 350° C. in molding temperature and 0° to 120° C. in mold temperature.

Plating on the thus obtained molded article can be carried out basically by chemical plating followed by electroplating according to plating techniques known for PA molded articles. Specifically plating may be conducted in the order of degreasing, pre-etching, etching, post-rinsing, activation (acceleration), chemical plating, and electroplating (refer to JITSUMU HYOMEN GIJUTSU, Vol. 33, No. 12, p. 518 (1986)).

Degreasing is for removal of stains which occur during injection molding or subsequent steps and is usually carried out by dipping the article in or wiping the article with a surface active agent, an alkaline solution, or an organic solvent. If the injection molded article is not stained, this step may be omitted.

In the etching step, the surface PA phase is etched with an acid. The acid etching solution usually contains 35% hydrochloric acid solution and an etching assistant, called an etchant, which prevents the dissolved PA amorphous component from re-adsorbing on the article. If necessary, etching may be preceded by pre-etching and/or followed by post-etching for etching stabilization.

A preferred concentration of the 35% hydrochloric acid is from 180 ml/l (180 ml of 35% hydrochloric acid diluted with 1 l of water) to 350 ml/l. At a concentration less than 180 ml/l, insufficient plate adhesion strength is seen, and at a concentration exceeding 350 ml/l, excessive etching occurs resulting also in insufficient adhesion strength. A particularly preferred concentration is from 240 to 300 ml/l. Etching is preferably carried out at a temperature of from 10° to 50° C., and particularly from 20° to 40° C. An etching temperature below 10° C. is impractical from the standpoint of temperature control. At a temperature exceeding 50° C., plate adhesion strength is reduced. Adhesion strength is not as dependent on immersion time, and sufficient adhesion can be obtained with 5 to 15 minutes immersion.

After etching is completed, the molded article is thoroughly washed with water and subjected to an activation step in which palladium is adsorbed onto the surface of the resin to aide in catalyzing chemical plating. Any known activation method may be used including (i) catalyst acceleration, (ii) sensitizer activation, and (iii) activator reduction. After the activation step, a thin layer of nickel is plated on the resin molded article, using conventional methods, to render the surface electrically conductive. In a final step, the nickel-plated article is electroplated with copper and then subjected to plating with a plating substance according to known electroplating techniques to provide a plating such as chromium plating, gold plating (using gold cyanide), imitation gold plating (Cu-Sn alloy plating or Cu-Zn alloy plating), or color plating (impurity-doped Ni plating).

The plated plastic articles according to the present invention are useful as exterior and interior automobile parts, such as fenders, steps, bumpers, door panels, grilles, emblems, hub caps, engine housings, side garnishes, corner panels, lamp housings, steering wheels, roofs, spoilers, instrument panels, and electromagnetic shields for electronic parts. They are also suitable as exterior parts of appliances, such as TV sets, cassettes, VTR, OA equipment, etc.

Having generally described this invention a further understanding can be obtained by reference to certain specific examples which are provided herein for purposes of illustration only and are not intended to be limiting unless otherwise specified. In the following description, all the parts, percents, and ratios are given by weight unless otherwise indicated.

EXAMPLES 1 TO 12 AND COMPARATIVE EXAMPLES 1 TO 7

1) Mixing and Kneading of Resin Composition:

The components shown in Tables 1 through 3 below were thoroughly dry blended in a Henschel mixer. The dry blend was melt-kneaded in a twin-screw extruder "TEX 44" manufactured by Japan Steel Works, Ltd. (L/D: 30) at 280° C. and 350 rpm and extruded into strands, followed by cutting to obtain pellets.

2) Preparation of Specimens:

The pellets, after having been dried at 80° C. and 0.1 mmHg for 48 hours, were injection molded in an injection molding machine "J 100" manufactured by Japan Steel Works, Ltd. (clamping tonnage: 100 t) under standard conditions of 280° C. in molding temperature and 80° C. in mold temperature to prepare test specimens 100 mm in length, 100 mm in width, and 3 mm in thickness. Additional specimens were prepared in the same manner except for changing the mold temperature to 60° C., 80° C., or 120° C. and the injection time to 1.5 sec, 4 sec, or 10 sec.

3) Determination of Microstructure of Resin Molded Article:

A cut surface of the injection molded specimen was examined by the above-described method to determine the γ crystal fraction and crystallinity of the PA phase.

4) Etching and Plating:

The specimen was immersed in a mixed solution containing 280 ml/l of 35% hydrochloric acid and 400 ml/l of an etchant "EP-Etching GL" produced by Kizai K.K. at 40° C. for 10 minutes. Then, the specimen was immersed in 70 ml/l of 35% hydrochloric acid solution at 30° C. for 1 minute for post-rinsing. After being washed with water, the specimen was further immersed in a mixed solution containing 100 ml/l of an activator "EP-Activator GL A" and 100 ml/l of an activator "EP-Activator GL B" both produced by Kizai K.K. at 30° C. for 3 minutes.

After being washed twice with water, the specimen was chemically plated with nickel by immersion in a nickel plating bath containing 100 ml/l of "EP-Nico GL A" and 100 ml/l of "EP-Nico GL B" both produced by Kizai K.K. at 40° C. for 10 minutes. After being washed twice with water, the specimen was acid-activated by dipping in 50 ml/l of sulfuric acid at room temperature for 1 minute and then electroplated with copper to a plate thickness of about 70 μm in copper sulfate solution. The plate adhesion was determined after allowing the Cu-plated sample to stand at room temperature for 60 days.

5) Evaluation:

i) Initial Plate Adhesion:

A 1 cm wide strip was scratched on the copper film of the Cu-plated sample, and a peel strength (kg/cm) of the film was measured at a peel angle of 90° and a peel rate of 30 mm/min. Considering that plate adhesion sometimes varies with location on the article, the measurement in this test was made at a position 30 mm or more apart from the gate.

ii) Blister after Thermal Cycle:

A plated sample was subjected to five thermal cycles of cooling to −30° C. and heating to 140° C., and the plate was observed with the naked eye to see if there was any blister of 1 mm or more in length.

The physical properties and microstructure of the PA phase of the resin molded article and plate adhesion of the plated resin molded article are shown in Tables 1 to 3 below.

TABLE 1

|  | Example 1 | Example 2 | Example 3 | Example 4 | Example 5 | Example 6 |
|---|---|---|---|---|---|---|
| Resin Composition (part): | | | | | | |
| (A) PA | MC160[1)] | MC160 | MC160 | MC160 + Nylon 66[3)] | MC120[2)] | MC160 |

TABLE 1-continued

|   |   | Example 1 | Example 2 | Example 3 | Example 4 | Example 5 | Example 6 |
|---|---|---|---|---|---|---|---|
|   |   | 55 | 55 | 55 | 25 + 30 | 55 | 70 |
|   | (relative viscosity) | (6.8) | (6.8) | (6.8) | (6.8, 4.0) | (2.5) | (6.8) |
| (B) | PPE[4] | 45 | 45 | 45 | 45 | 45 | 30 |
|   | (intrinsic viscosity) | (0.51) | (0.51) | (0.51) | (0.51) | (0.46) | (0.51) |
| (C) | SB[5] | 10 | 10 | 10 | 10 | 10 | 10 |
| (D) | Maleic anhydride[6] | 0.7 | 0.7 | 0.7 | 0.7 | 0.7 | 0.7 |
| Molding Conditions: |   |   |   |   |   |   |   |
| Mold Temperature (°C.) |   | 80 | 60 | 80 | 80 | 80 | 80 |
| Injection Time (sec) |   | 3 | 3 | 10 | 3 | 3 | 3 |
| Microstructure of PA Phase: |   |   |   |   |   |   |   |
| γ Crystal Fraction (%) |   | 100 | 100 | 75 | 76 | 100 | 95 |
| Crystallinity (%) |   | 42 | 38 | 42 | 50 | 48 | 45 |
| Plate Properties: |   |   |   |   |   |   |   |
| Initial Adhesion (kg/cm) |   | 1.8 | 1.6 | 1.4 | 1.4 | 1.6 | 1.3 |
| Blister After Thermal Cycle |   | none | none | none | none | none | none |

TABLE 2

|   |   | Compar. Example 1 | Compar. Example 2 | Compar. Example 3 | Compar. Example 4 | Compar. Example 5 | Compar. Example 6 | Compar. Example 7 |
|---|---|---|---|---|---|---|---|---|
| Resin Composition (part): |   |   |   |   |   |   |   |   |
| (A) | PA | MC160[1] | MC160 | MC160 | MC160 | MC160 | MC160 | modified MC100L[7] |
|   |   | 55 | 55 | 55 | 85 | 15 | 55 | 55 |
|   | (relative viscosity) | (6.8) | (6.8) | (6.8) | (6.8) | (6.8) | (6.8) | (1.5) |
| (B) | PPE[4] | 45 | 45 | 45 | 15 | 85 | 45 | 45 |
|   | (intrinsic viscosity) | (0.51) | (0.51) | (0.51) | (0.51) | (0.46) | (0.51) | (0.51) |
| (C) | SB[5] | 10 | 10 | 10 | 10 | 10 | 55 | 10 |
| (D) | Maleic anhydride[6] | 0.7 | 0.7 | 0.7 | 0.7 | 0.7 | 0.7 | 0.7 |
| Molding Conditions: |   |   |   |   |   |   |   |   |
| Mold Temperature (°C.) |   | 120 | 80 | 80 | 80 | 80 | 80 | 80 |
| Injection Time (sec) |   | 3 | 1.5 | 3 | 3 | 3 | 3 | 3 |
| Microstructure of PA Phase: |   |   |   |   |   |   |   |   |
| γ Crystal Fraction (%) |   | 65 | 60 | 80 | 90 | 100 | 100 | 95 |
| Crystallinity (%) |   | 66 | 62 | 65 | 58 | 15 | 43 | 55 |
| Plate Properties: |   |   |   |   |   |   |   |   |
| Initial Adhesion (kg/cm) |   | 0.6 | 0.5 | 0.8 | 0.9 | 0.2 | 1.6 | 0.4 |
| Blister After Thermal Cycle |   | observed | observed | observed | observed | observed | observed | observed |

TABLE 3

|   |   | Example 7 | Example 8 | Example 9 | Example 10 | Example 11 | Example 12 |
|---|---|---|---|---|---|---|---|
| Resin Composition (part): |   |   |   |   |   |   |   |
| (A) | PA | MC160[1] | MC160 | MC160 | MC160 | MC160 | MC160 |
|   |   | 55 | 55 | 55 | 55 | 55 | 55 |
|   | (relative viscosity) | (6.8) | (6.8) | (6.8) | (6.8) | (6.8) | (6.8) |
| (B) | PPE[4] | 45 | 45 | 45 | 45 | 45 | 45 |
|   | (intrinsic viscosity) | (0.51) | (0.51) | (0.51) | (0.51) | (0.51) | (0.51) |
| (C) | Impact Modifier | H-SB[8] | SB[5] | SB | SB | SB | SB |
|   |   | 10 | 10 | 10 | 10 | 10 | 10 |
| (D) | Compatibilizer | Maleic anhydride[6] 0.7 | N-PM[9] 1.0 | TMC[10] 1.0 | E-PB[11] 2.0 | Fumaric acid[12] 2.5 | S/MA[13] 15 |
| Molding Conditions: |   |   |   |   |   |   |   |
| Mold Temperature (°C.) |   | 80 | 80 | 80 | 80 | 80 | 80 |
| Injection Time (sec) |   | 3 | 3 | 3 | 3 | 3 | 3 |
| Microstructure of PA Phase: |   |   |   |   |   |   |   |
| γ Crystal Fraction (%) |   | 100 | 90 | 74 | 92 | 96 | 88 |
| Crystallinity (%) |   | 42 | 40 | 50 | 45 | 42 | 40 |
| Plate Properties: |   |   |   |   |   |   |   |
| Initial Adhesion (kg/cm) |   | 1.8 | 1.6 | 1.2 | 1.3 | 1.4 | 1.4 |

TABLE 3-continued

| | Example 7 | Example 8 | Example 9 | Example 10 | Example 11 | Example 12 |
|---|---|---|---|---|---|---|
| Blister After Thermal Cycle | none | none | none | none | none | none |

Note:
[1]"KANEBO NYLON MC160", nylon 6 produced by Kanebo Ltd.; relative viscosity: 6.8.
[2]"KANEBO NYLON MC120", nylon 6 produced by Kanebo Ltd.; relative viscosity: 2.5.
[3]"ULTRAMID A4", nylon 66 produced by Badische Anilin & Soda A.G.; relative viscosity: 4.0.
[4]Poly(2,6-dimethyl-1,4-phenylene)ether; intrinsic viscosity: 0.51 dl/g or 0.46 dl/g in chloroform at 30° C.
[5]"Cariflex TR KX65", styrene-butadiene-styrene block copolymer produced by Shell Chemical Company Limited; styrene content: 28%; MFR: 1.1 g/10 min (190° C., 2.16 kg).
[6]Commercially available maleic anhydride (first class grade (JIS K 8001, hereinafter the same))
[7]Nylon 6 prepared by melt-kneading "KANEBO NYLON MC100L" produced by Kanebo Ltd. (relative viscosity: 2.1) once in a single-screw extruder (L/D: 30) at 280° C. and pelletized so as to reduce its molecular weight to a relative viscosity of 1.5.
[8]"Kraton G1651", hydrogenated styrene-butadiene block copolymer produced by Shell Chemical Company Limited; styrene content: 33%.
[9]Commercially available N-phenylmaleimide (first class grade)
[10]Commercially available trimellitic acid chloride
[11]"BF 1000", liquid epoxidized polybutadiene produced by Adeka Argus Chemical Co., Ltd.; oxirane value: 7.5%; molecular weight: ca. 1000.
[12]Commerically available fumaric acid (first class grade)
[13]"Dylark 232", styrene-maleic anhydride copolymer produced by Alco Polymer Inc.

It is apparent from Tables 1 to 3 that the resin molded articles according to the present invention provide plated articles having excellent plate appearance and plate adhesion while exhibiting good balance of mechanical and physical properties as compared with any of the comparative samples.

While the invention has been described in detail and with reference to specific examples thereof, it will be apparent to one of ordinary skill in the art that various changes and modifications can be made thereto without departing from the spirit and scope of the invention as set forth herein.

What is claimed is:

1. A plated polyamide resin article obtained by plating a molded article of a polyamide resin composition consisting essentially of (A) from 30 to 80% by weight of a polyamide resin, (B) from 20 to 70% by weight of a polyphenylene ether resin, (C) from 1 to 50 parts by weight, per 100 parts by weight of the sum of (A) and (B), of an impact modifier, and (D) from 0.01 to 30 parts by weight, per 100 parts by weight of the sum of (A) and (B), of a compatibilizer, in which said polyamide resin forms a continuous phase, and said polyphenylene ether resin forms a dispersed phase, said polyamide resin having a crystallinity of from 20 to 55% with a γ crystal fraction of the crystalline region thereof being not less than 72%.

2. A plated polyamide resin article as claimed in claim 1, wherein said polyamide resin is nylon 6 or nylon 66.

3. A plated polyamide resin article as claimed in claim 1, wherein said polyphenylene ether resin is poly(2,6-dimethyl-1,4-phenylene)ether.

4. A plated polyamide resin article as claimed in claim 1, wherein said impact modifier is a hydrogenated styrene-butadiene-styrene block copolymer.

5. A plated polyamide resin article as claimed in claim 1, wherein said compatibilizer is maleic anhydride.

6. A plated polyamide resin article as claimed in claim 1, wherein said dispersed phase of polyphenylene ether has an average longest axis length of from 0.01 to 15 μm and an average shortest axis length of from 0.01 to 8 μm.

7. A plated polyamide resin article as claimed in claim 6, wherein a number average particle size of the dispersed polyphenylene ether resin particles is not more than 1 μm.

8. A plated polyamide resin article as claimed in claim 1, wherein said plating is selected from the group consisting of nickel, copper, chromium, gold, gold cyanide, Cu-Sn alloy, Cu-Zn alloy, and doped Ni.

9. A plated polyamide resin article as claimed in claim 8, wherein said plating is chromium plating.

10. A plated polyamide resin article as claimed in claim 1, wherein said polyamide resin has a relative viscosity of not less than 2.0 in 98% concentrated sulfuric acid at 25° C. and wherein said polyphenylene ether resin has an intrinsic viscosity of not less than 0.15 dl/g in chloroform at 30° C.

11. A process for preparing a plated polyamide resin articles comprising the steps of:
molding a polyamide resin composition consisting essentially of: (A) from 30 to 80% of a polyamide resin, (B) from 20 to 70% of a polyphenylene ether resin, (C) from 1 to 50 parts by weight, per 100 parts by weight of the sum of (A) and (B), of an impact modifier, and (D) from 0.01 to 30 parts by weight, per 100 parts by weight of the sum of (A) and (B), of a compatibilizer, in which said polyamide resin forms a continuous phase, said polyphenylene ether resin form a dispersed phase, said polyamide resin having a crystallinity of from 20 to 55% with a γ crystal fraction of the crystalline region thereof being not less than 72%, to form a polyamide resin article; and plating said polyamide resin article with a plating substance.

12. The process of claim 11, wherein said plating step further comprises chemical plating, followed by electroplating.

13. The process of claim 11, further comprising prior to plating:
degreasing the polyamide resin article by dipping or wiping said article with a surface active agent, alkaline solution or organic solvent; etching the polyamide resin article with a solution comprising a mineral acid and an etchant;
activating a surface of said article by absorbing a plating catalyst onto said surface.

14. The process of claim 11, wherein said plating substance is selected from the group consisting of nickel, gold, copper, chromium, gold cyanide, Cu-Sn alloy, Cu-Zn alloy and doped Ni.

15. The process of claim 14, wherein said plating substance is chromium.

16. The process of claim 11, wherein said polyamide resin in nylon 6 or nylon 66.

17. The process of claim 11, wherein said polyphenylene ether resin is poly(2,6-dimethyl-1,4-phenylene)ether.

18. The process of claim 11, wherein said impact modifier is a hydrogenated styrene-butadiene-styrene block copolymer.

19. The process of claim 11, wherein said compatibilizer is maleic anhydride.

20. The process of claim 11, wherein said polyamide resin has a relative viscosity of not less than 2.0 in 98% concentrated sulfuric acid at 25° C. and wherein said polyphenylene ether resin has an intrinsic viscosity of not less than 0.15 dl/g in chloroform at 30° C.

21. The process of claim 11, wherein said dispersed phase of polyphenylene ether resin has an average longest axis length of from 0.01 to 15 μm and an average shortest axis length of from 0.01 to 8 μm.

22. The process of claim 21, wherein a number average particle size of the dispersed polyphenylene ether resin particles is not more than 1 μm.

* * * * *